United States Patent
Shih

(10) Patent No.: US 10,933,803 B2
(45) Date of Patent: Mar. 2, 2021

(54) AUTONOMOUS VEHICLE VISUAL BASED COMMUNICATION

(71) Applicant: GM Cruise Holdings LLC, San Francisco, CA (US)

(72) Inventor: Christopher Shih, San Francisco, CA (US)

(73) Assignee: GM CRUISE HOLDINGS LLC, San Francisco, CA (US)

(*) Notice: Subject to any disclaimer, the term of this patent is extended or adjusted under 35 U.S.C. 154(b) by 2 days.

(21) Appl. No.: 16/371,001

(22) Filed: Mar. 31, 2019

(65) Prior Publication Data

US 2020/0307448 A1 Oct. 1, 2020

(51) Int. Cl.
| | | |
|---|---|---|
| *B60Q 1/50* | (2006.01) | |
| *G06K 9/00* | (2006.01) | |
| *G06F 3/01* | (2006.01) | |
| *G05D 1/00* | (2006.01) | |

(52) U.S. Cl.
CPC ............ *B60Q 1/50* (2013.01); *G05D 1/0088* (2013.01); *G06F 3/013* (2013.01); *G06K 9/00369* (2013.01); *G06K 9/00791* (2013.01); *G05D 2201/0213* (2013.01)

(58) Field of Classification Search
CPC .......... B60Q 1/50; B60Q 1/503; B60Q 1/525; B60Q 1/506
See application file for complete search history.

(56) References Cited

U.S. PATENT DOCUMENTS

| | | | |
|---|---|---|---|
| 8,749,401 B2 | 6/2014 | Hara et al. | |
| 8,954,252 B1 | 2/2015 | Urmson et al. | |
| 9,483,948 B1 | 11/2016 | Gordon et al. | |
| 9,694,736 B2 | 7/2017 | Williams et al. | |
| 2015/0268665 A1 | 9/2015 | Ludwick et al. | |
| 2015/0336502 A1* | 11/2015 | Hillis ............... | G06F 3/017 701/23 |
| 2017/0262715 A1* | 9/2017 | Kozuka ............. | G08G 1/166 |
| 2019/0156130 A1* | 5/2019 | Kozuka ............. | G08G 1/167 |

* cited by examiner

*Primary Examiner* — Qutbuddin Ghulamali
(74) *Attorney, Agent, or Firm* — Medley, Behrens & Lewis, LLC

(57) ABSTRACT

An autonomous vehicle including a projector and a sensor system configured to output data representative of an object in an environment exterior of the autonomous vehicle. The autonomous vehicle can further include a data store that stores height map data. A computing system of the autonomous vehicle can classify an object as a person and can detect an initial position of the person. Responsive to the detection, the computing system can calibrate a notification to be projected on a ground of the environment exterior of the autonomous vehicle. The notification is based on output of a transform from a position of the projector to the ground and the transform is applied based on the predefined height map of the ground. The notification can be projected adjacent the person. The notification may be configured to inform the person that the autonomous vehicle detects a position of the person.

20 Claims, 8 Drawing Sheets

AUTONOMOUS VEHICLE VISUAL BASED COMMUNICATION

BACKGROUND

An autonomous vehicle is a motorized vehicle that can operate without a human driver. Since the autonomous vehicle lacks a human driver, others in an environment nearby the autonomous vehicle often may have difficulty understanding actions to be taken by the autonomous vehicle because of the lack of a human driver. In contrast, others in an environment nearby a human operated vehicle may be able to interact with the driver. According to an illustration, before a person (e.g., pedestrian) performs a certain maneuver near a human operated vehicle (e.g., crossing the street), the person can attempt to determine whether the driver is aware of the person. Conventionally, this could be done via trying to make eye contact with the driver of the vehicle and/or receiving a signal from the driver indicating approval for the person to conduct the maneuver by using hand maneuvers or other signals.

SUMMARY

The following is a brief summary of subject matter that is described in greater detail herein. This summary is not intended to be limiting as to scope of the claims.

Described herein are various technologies pertaining to causing an autonomous vehicle to project an informative notification on the ground exterior of the autonomous vehicle. With more specificity, the autonomous vehicle can detect a location of an object and can project the notification adjacent the location of the object. The notification can inform the object that the autonomous vehicle is aware of and detects the location of the object. The notification can further inform the object that the autonomous vehicle is tracking the object over a certain duration. The notification can further include an indication that can inform the person which autonomous vehicle is providing the notification.

The autonomous vehicle can include a sensor system that is configured to output data representative of an object in an environment exterior of the autonomous vehicle. The autonomous vehicle can further include a computing system in communication with the sensor system that is configured to classify the object in the data from the sensor system. The object can be classified based on a predefined list of object classes.

In an example, responsive to classifying the object as a person (e.g., a pedestrian, a bicyclist), the computing system can detect an initial position of the object. The computing system can then calibrate a notification to be projected on a ground of the environment exterior of the autonomous vehicle adjacent the initial position. The notification can be calibrated based on defining a first plane based on a position of a projector and an output of a transform from the position of the projector of the autonomous vehicle to the ground. The affine transform can be applied based on a predefined height map of the ground the notification is being projected on. After calibrating the notification for projection, the computing system can then use a projector to display the notification.

In another example, responsive to classifying the object as a person, the computing system can identify a gaze of the person and detect when the gaze is aimed at the autonomous vehicle. When the computing system detects that the gaze is aimed at the autonomous vehicle, the computing system can cause a projector of the autonomous vehicle to project a notification on the ground of the environment exterior of the autonomous vehicle at a location adjacent a location of the person. The computing system can cause the projector to continue to project the notification on the ground of the environment at the location adjacent the location of the person after the gaze of the person moves away from the autonomous vehicle for a predetermined period of time. Alternatively, when the gaze of the person is not aimed at the autonomous vehicle (or after the predetermined period of time), the computing system can inhibit the projector of the autonomous vehicle from projecting a notification on the ground of the environment at the location adjacent the location of the person.

In an embodiment, the computing system can move the notification with the person as the person moves. In another embodiment, the computing system can project the notification until the object exceeds a threshold distance from the autonomous vehicle, the object completes a predefined maneuver, and/or a predefined threshold projection time is exceeded. If the person and/or autonomous vehicle moves relative to each other during this period, the computing system can apply a rolling transform to calibrate the notification based on the new locations.

The above-described technologies present various advantages over conventional approaches to autonomous vehicle operation. First, unlike the conventional approach of providing a hard to interpret indication on a body of the autonomous vehicle to inform people the autonomous vehicle is aware of them, the above-described technologies provide a location specific notification that informs the person that the autonomous vehicle sees them and knows where they are. Moreover, the above-described technologies provide for individualized notifications so that a person is informed that the autonomous vehicle is aware of them specifically and not just aware of pedestrians in the aggregate that may be around the person. Further, the above-described technologies do not require continuous eye contact with the autonomous vehicle for a person to know the autonomous vehicle detects them. Additionally, the above-described technologies provide for a notification that does not need to be translated for different languages.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
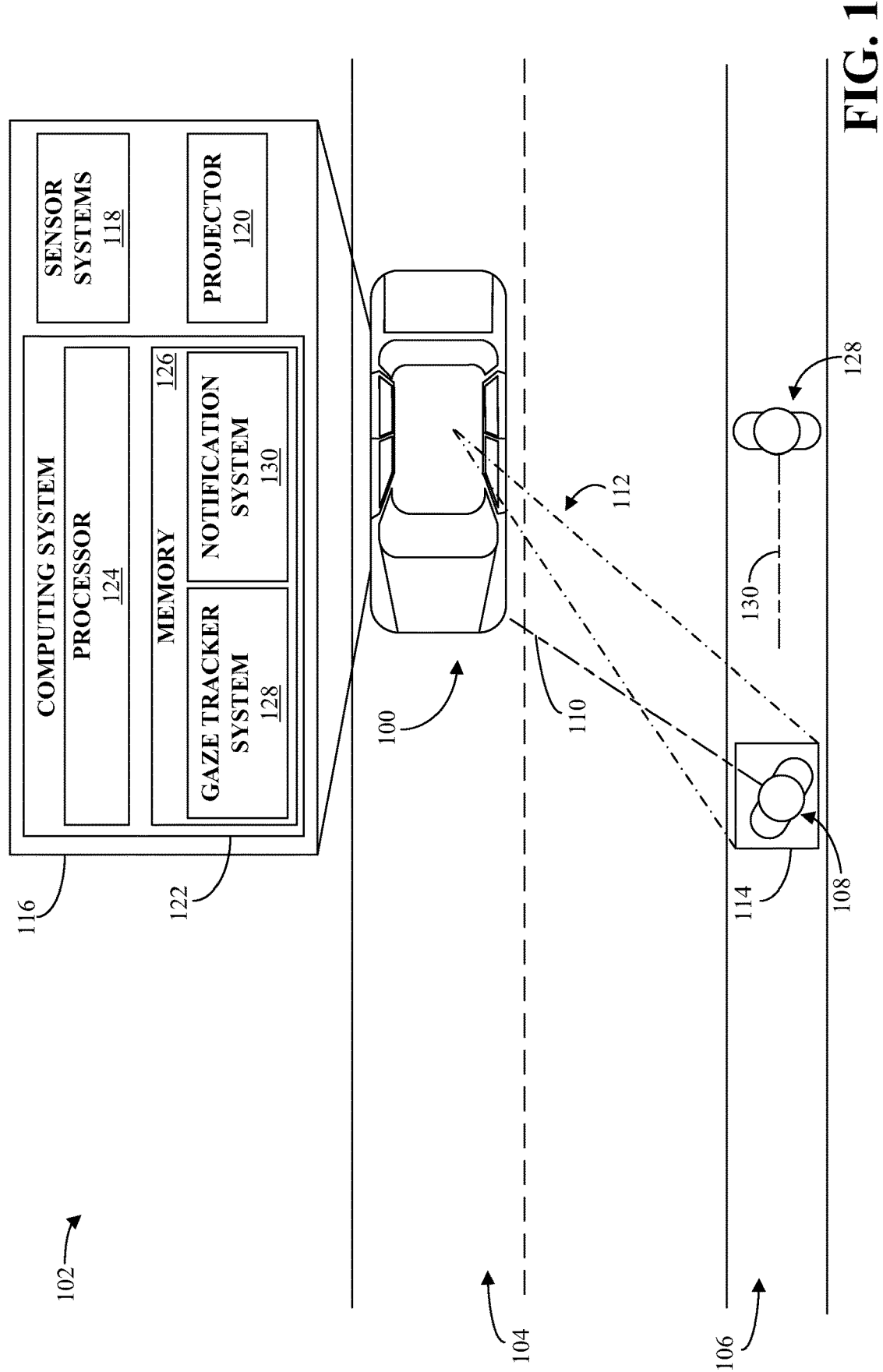
FIG. 1 is a schematic that illustrates an autonomous vehicle providing a notification to a pedestrian.

Various technologies pertaining to controlling a projector of an autonomous vehicle to output notifications into an environment nearby the autonomous vehicle to signal awareness of the autonomous vehicle are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean serving as an illustration or example of something and is not intended to indicate a preference.

Moreover, as used herein, the term "person" is intended to encompass any being capable of looking at a vehicle. The being can include, but is not limited to, a biological person, a service animal, and/or the like.

Disclosed are various technologies that generally relate to projecting a notification from an autonomous vehicle to a surface in an environment exterior of the autonomous vehicle. A computing system of the autonomous vehicle receives output from a sensor system representative of the exterior environment. The computing system then classifies objects in the exterior environment and projects a notification when a person is detected looking at the autonomous vehicle. The computing system can further be configured to calibrate the notification prior to projection based on output from an affine transform that is applied based on an elevation of the surface the notification is being projected on.

With reference now to FIG. 1, a schematic that illustrates an operating environment 102 of an autonomous vehicle 100 is depicted. The operating environment 102 includes a roadway 104 that autonomous vehicle 100 travels along on and a pedestrian walkway 106 that one or more pedestrians walks along on. In the illustrated embodiment, the pedestrian walkway 106 is adjacent the roadway 104.

In the illustrated environment 102, a first pedestrian 108 and a second pedestrian 128 are on the pedestrian walkway 106. Conventionally, in order to ascertain whether a vehicle is aware of a pedestrian, the pedestrian would attempt to gain the attention of a driver of the vehicle and/or obtain some sort of acknowledgement from the driver that the driver is aware of the pedestrian. However, since an autonomous vehicle lacks a human driver, a pedestrian may not be readily able to determine whether a traditional autonomous vehicle is aware of the pedestrian. In contrast, the technologies described herein present a notification to the pedestrian that the autonomous vehicle 100 is aware of the pedestrian.

More specifically, the autonomous vehicle 100 includes componentry configured to detect when a pedestrian is looking at the autonomous vehicle 100 and to provide a notification to the pedestrian that the autonomous vehicle 100 is aware of them. Componentry of the autonomous vehicle 100 is illustrated in callout 116. The autonomous vehicle 100 includes sensor systems 118, a projector 120, and a computing system 122. The sensor systems 118 may be configured to output data representative of an environment exterior of the autonomous vehicle 100. The sensor systems 118 may include one or more sensors that are arranged about the autonomous vehicle 100, as will be described in detail below. The projector 120 can include any light emitting system, visual communication system, laser-based system, and/or the like. The projector 120 may be configured to project an image and/or moving images onto a surface in the environment exterior of the autonomous vehicle 100. The projector 120 may be located at any suitable location on the autonomous vehicle 100 for projecting the image onto the surface. For instance, in one embodiment, the projector 120 is located on an outer side of a roof of the autonomous vehicle 100. In another embodiment, the projector 120 is located on interior of the autonomous vehicle 100. In a further embodiment, the projector 120 can be located around a bottom of the autonomous vehicle 100. In yet another embodiment, the projector can be embedded in one or more sides of the autonomous vehicle 100. The projector 120 can be mounted in any suitable position on the autonomous vehicle 100. According to an example, the projector 120 can project in any direction around the autonomous vehicle 100 (e.g., the projector 120 can project over a 360-degree coverage region). Further, it is contemplated that the autonomous vehicle 100 can include a plurality of projectors to enable projecting in any direction around the autonomous vehicle 100 (e.g., a 360-degree coverage region can be covered by two or more projectors).

The computing system 122 may be in communication with the sensor systems 118 and the projector 120. The computing system 122 includes a processor 124 and memory 126 that includes computer-executable instructions that are executed by the processor 124. In an example, the processor 124 can be or include a graphics processing unit (GPU), a plurality of GPUs, a central processing unit (CPU), a plurality of CPUs, an application-specific integrated circuit (ASIC), a microcontroller, or the like. The memory 126 includes a gaze tracker system 128 and a notification system 130.

The gaze tracker system 128 is configured to detect when a person is looking at the autonomous vehicle 100. More specifically, the gaze tracker system 128 can be configured to receive output from the sensor systems 118 and to determine whether a person is looking at the autonomous vehicle 100. The gaze tracker system 128 can be configured to identify a gaze of a person. The gaze tracker system 128 can be further configured to determine whether that gaze is aimed at the autonomous vehicle 100. The gaze tracker system 128 can be configured to provide this gaze data to the notification system 130.

The notification system 130 is configured to provide a notification to a person to indicate to them that the autonomous vehicle 100 is aware of the person. Additionally, the notification may inform the person that the autonomous vehicle 100 is aware of a position of the person in the environment exterior the autonomous vehicle 100. To this end, responsive to receiving information from the gaze tracker system 128 that a person is looking at the autonomous vehicle 100, the notification system 130 can be configured to determine a position of the person looking at the autonomous vehicle 100 and to present the notification adjacent this position.

The notification system 130 can be further configured to cause the projector 120 to project the notification on a surface of the environment exterior of the autonomous vehicle 100. The notification can be presented on any suitable surface for informing the person that the autonomous vehicle 100 detects them. In an embodiment, the notification can be presented on the same surface as the one the person is standing (e.g., on the sidewalk when the person is standing on the sidewalk). In another embodiment, the notification can be presented on a wall (e.g., a wall of a building) when the person is adjacent that the wall.

The notification comprises any suitable indication for informing the person that the autonomous vehicle 100 detects the person. For instance, the notification can comprise an image that is projected onto the surface the person is standing on and that surrounds a portion of a footprint of the person. In another example, the notification can be projected in front of a direction of travel of the person, so the person need not look directly downward to see the notification. This version can be advantageous for a person operating a bicycle and/or a different vehicle because operation while looking directly downward for the notification can be difficult. The image can comprise any shape and/or pattern. For instance, the image can comprise a rectangular outline and/or a solid patterned rectangle.

An illustrative example of the autonomous vehicle 100 detecting that a person is looking at the autonomous vehicle 100 and, accordingly, providing a notification to that person is presented in FIG. 1. More specifically, in the illustrated embodiment, the gaze tracker system 128 can, based on output from the sensor systems 118, identify a gaze 110 of a first person 108 and a gaze 130 of a second person 128. The gaze tracker system 128 can then determine that the gaze 110 of the first person 108 is aimed at the autonomous vehicle 100 while the gaze 130 of the second person 128 is aimed elsewhere. The gaze tracker system 128 can then provide this gaze data to the notification system 130.

Responsive to receiving this gaze data, the notification system 130 can determine a position of the first person 108. The notification system 130 can then cause the projector 120 to project 112 a notification 114 adjacent the first person 108. In the illustrated embodiment, the notification 114 comprises a rectangular image that surrounds a footprint of the first person 114. As can be seen in FIG. 1, because the second person 128 is not looking at the autonomous vehicle 100, the second person 128 may not be provided with a notification.

Figure 2:
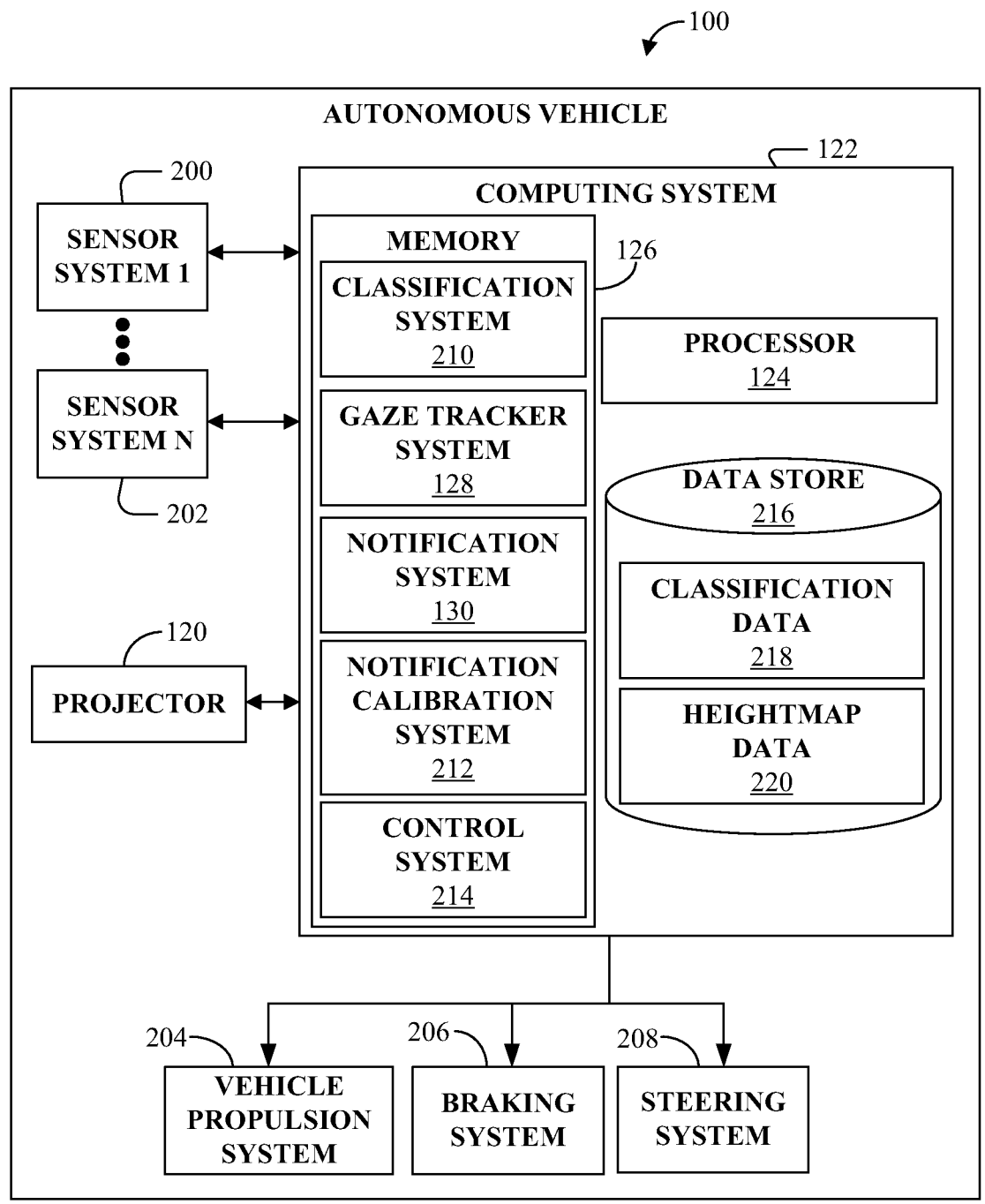
FIG. 2 illustrates an exemplary autonomous vehicle.

Turning now to FIG. 2, illustrated is a block diagram of the exemplary autonomous vehicle 100 of FIG. 1. The autonomous vehicle 100 can navigate about roadways without human conduction based upon sensor signals output by the sensor systems 118 of the autonomous vehicle 100. The sensor systems 118 of the autonomous vehicle 100 illustrated in FIG. 1 are illustrated by a plurality of sensor systems in FIG. 2, namely, a sensor system 1 200, . . . , and a sensor system N 202 (collectively referred to herein as sensor systems 200-204). The sensor systems 200-202 are of different types and may be arranged about the autonomous vehicle 100. For example, the sensor system 1 200 may be a lidar sensor system and the sensor system N 202 may be a camera (image) system. Other exemplary sensor systems 200-202 included are radar sensor systems, global positioning system (GPS) sensor systems, sonar sensor systems, infrared sensor systems, and the like.

The autonomous vehicle 100 further includes several mechanical systems that are used to effectuate appropriate motion of the autonomous vehicle 100. For instance, the mechanical systems can include, but are not limited to, a vehicle propulsion system 204, a braking system 206, and a steering system 208. The vehicle propulsion system 204 may be an electric motor, an internal combustion engine, a combination thereof, or the like. The braking system 206 can include an engine brake, brake pads, actuators, and/or any other suitable componentry that is configured to assist in decelerating the autonomous vehicle 100. The steering system 208 includes suitable componentry that is configured to control the direction of the movement of the autonomous vehicle 100.

The autonomous vehicle 100 additionally comprises the computing system 122 that is in communication with the sensor systems 200-202, the vehicle propulsion system 204, the braking system 206, the steering system 208, and/or the projector 120. Again, the computing system 122 includes the processor 124 and the memory 126.

In addition to including the gaze tracker system 128 and the notification system 130 as described above, the memory 126 includes a control system 214 configured to control operation of the vehicle propulsion system 204, the braking system 206, and/or the steering system 208. Additionally, or alternatively, the memory 126 can further include a classification system 210 that is configured to classify an object observed by the autonomous vehicle 100 and/or a notification calibration system 212 that is configured to calibrate the notification for display on a surface, as will be described in detail below.

The computing system 122 may further include a data store 216. The data store 216 includes classification data 218. The classification data 218 can include data indicative of one or more predefined object classes. Each object class can be further broken down into subordinate classes. For instance, an object class of person can be broken down into pedestrian, bicyclist, pedestrian with a stroller, pedestrian in a wheelchair, pedestrian with a service animal (e.g., seeing eye dog), person operating a differing vehicle (e.g., vehicle driver, motorcyclist, etc.), and/or the like. The autonomous vehicle 100 can use this data to classify objects in the environment exterior of the autonomous vehicle 100. For instance, the classification system 210 can be configured to use the classification data 218 to classify objects in the environment exterior of the autonomous vehicle 100. The classification system 210 may be configured to receive output from the sensor systems 200-202 representative of an environment exterior of the autonomous vehicle 100 detected by the sensor systems 200-202. The classification system 210 can then access the classification data 218 to classify one or more objects in the environment exterior of the autonomous vehicle 100.

In an embodiment, the classification system 210 can be used to selectively operate the gaze tracker system 128. Selective operation of the gaze tracker system 128 can be used to regulate the allocation of processing power of the autonomous vehicle 100. For example, the gaze tracker system 128 is deactivated for objects classified in non-person classes. In another embodiment, the gaze tracker system 128 is activated for all classifications.

The data store 220 further includes heightmap data 220. The heightmap data 220 can include data indicative of terrain elevations for an area traversed by one or more autonomous vehicles. A heightmap can contain one channel interpreted as a distance of displacement or "height" from the "floor" of a surface. A heightmap can be visualized as luma of a grayscale image, with black representing minimum height and white representing maximum height.

The notification calibration system 212 can be configured to use the heightmap data 220 to calibrate the notification prior to presenting the notification. The notification calibration system 212 can be configured to perform an intrinsic calibration and/or an extrinsic calibration. The extrinsic calibration can involve orienting the projector 120 for projection on the surface. For instance, the extrinsic calibration can involve moving the projector 120 in a three-dimensional plane. Additionally, or alternatively, the extrinsic calibration can include accounting for linear movement along a linear direction (e.g., x, y, z axes), roll, pitch and/or yaw the projector 120 may experience as the autonomous vehicle 100 travels along a roadway. This extrinsic calibration determines the initial plane the notification is being projected from.

The intrinsic calibration can comprise applying a transform. Applying the transform can include applying an affine transform and/or applying image homography. Applying the transform can include providing inputs into an affine transformation and transforming (calibrating) the notification based on an output from the affine transformation. The affine transformation is a linear mapping that preserves points, straight lines, and planes. The affine transformation can be used to correct for geometric distortions or deformations that occur when projecting an image from one plane onto another plane. Image homography can be used to correct for geometric distortions or deformations that occur when projecting image from one surface to another surface.

With regard to the technologies disclosed herein, the transform is applied based on the heightmap data 220. More specifically, the notification calibration system 212 can be configured to receive location data from the notification system 130 indicative of a location of the person and to access the heightmap data 220 to find an elevation of the surface the notification will be projected on. An elevation of the projector 120 and a distance from the projector 120 to the location where the notification will be projected can be determined by any suitable mechanism. For instance, one or more of the sensor systems 200-202 can detect an elevation of the autonomous vehicle 100 that can then be used to determine the elevation of the projector 120, e.g. via the notification calibration system 212.

The notification calibration system 212 can apply the elevation of the surface, the elevation of the projector 120, the initial plane the notification is being projected from, and the distance from the projector to the surface to the transform. The transform then provides an output based on these inputs and responsive to receiving the output, the notification calibration system 212 can alter or calibrate the notification based on the output prior to the notification system 130 projecting the notification.

Figure 3:
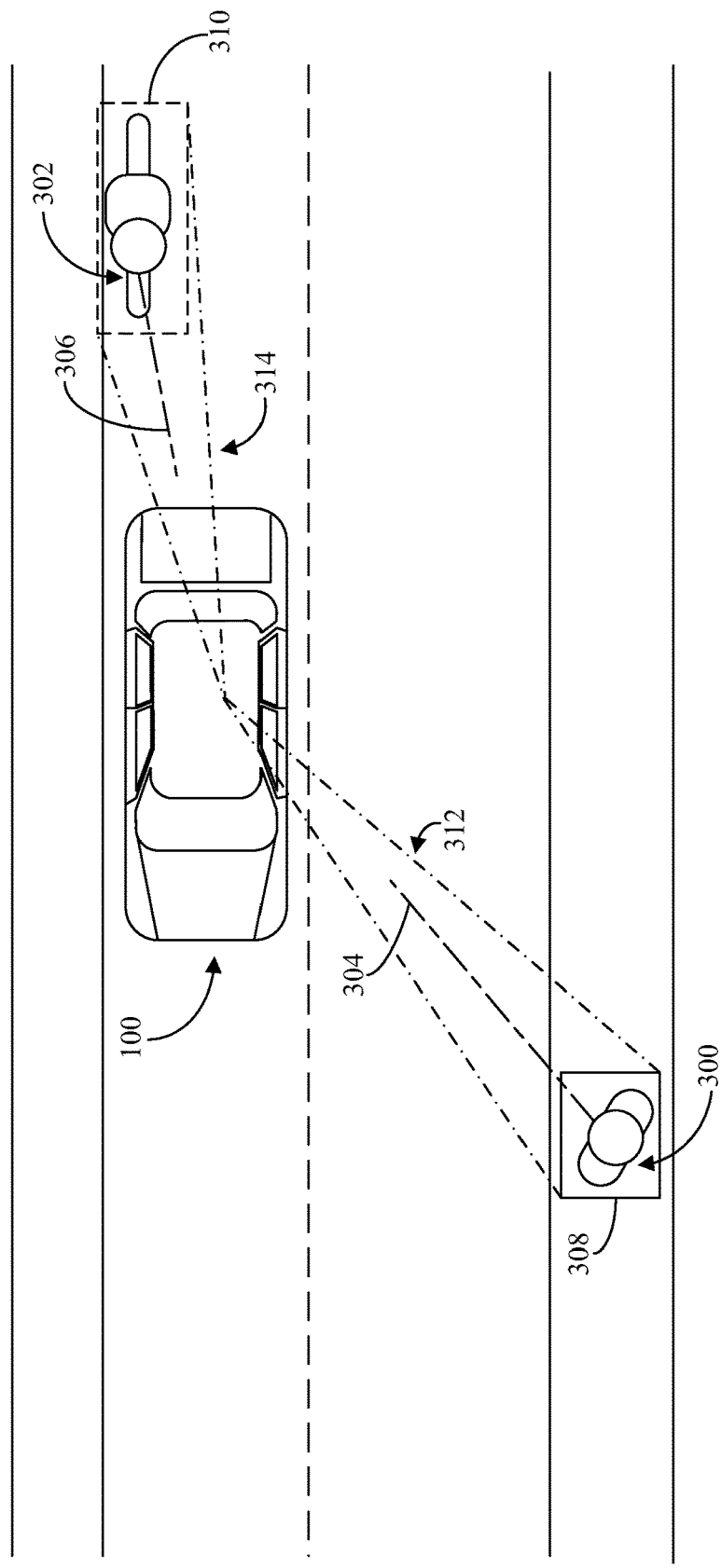
FIG. 3 illustrates an exemplary driving environment of an autonomous vehicle.

Turning now to FIG. 3, a different notification may be provided to different person classes. For instance, a first notification may be provided to a first object class while a different second notification may be provided to a second object class. The different notifications can have one or more suitable varying characteristic, e.g., color, shape, size, and/or the like. For instance, a red rectangular notification can be provided to pedestrians while a blue ellipsoidal notification can be provided to bicyclists.

In the illustrated embodiment, the classification system 210 of the autonomous vehicle 100 receives output from the sensor systems 200-202 representative of the environment exterior of the autonomous vehicle 100. The classification system 210 can then classify a first object as a pedestrian 304 and a second object as a bicyclist 310. Responsive to this classification, the gaze tracker system 128 can detect that a gaze 304 of the pedestrian 300 and a gaze 306 of the bicyclist 302 are each aimed at the autonomous vehicle 100. The gaze tracker system 128 can provide this gaze data to the notification system 130. Responsive to receiving the gaze data, the notification system 130 can identify a location of the pedestrian 300 and a location of the bicyclist 302.

The notification system 130 provides this location data to the notification calibration system 212 that can then access the heightmap data 220 to determine an elevation of the location of the pedestrian 300 and an elevation of the location of the bicyclist 302. The notification calibration system 212 can apply the transform to the elevation information to generate a corresponding output such that the can be used to calibrate a first notification 308 for projection at the location of the pedestrian 300 and a second notification 310 for projection at the location of the bicyclist 302. As illustrated, since the location of the pedestrian 300 and the location of the bicyclist 302 are different, the transform may provide a different output for each. The notification calibration system 212 can then provide the calibrated first notification 308 and/or the calibrated second notification 310 to the notification system 130.

Responsive to receiving the calibrated notification, the notification system 130 is configured to cause a projector to project 312 the first notification 308 at the location of the pedestrian 300 and/or to project 314 the second notification 310 at the location of the bicyclist 302. In the illustrated embodiment, the notification system 130 employs the same projector to project both the first notification 308 and the second notification 310. It is also contemplated herein that different projectors may be used for each of the different projections 312 and 314.

The notification system 130 may be further configured to project the notification for a period after the initial gaze detection regardless of whether the gaze of the person is still aimed at the autonomous vehicle. For instance, the autonomous vehicle can continue projecting the notification while the person performs a predefined maneuver. The predefined maneuver can include any behavior by the person that may impact maneuvering of the autonomous vehicle. For instance, the predefined maneuver can include crossing a street along a crosswalk, crossing a street at an area other than a crosswalk, making a turn at an intersection, passing the autonomous vehicle, and/or the like. In another example, the autonomous vehicle can continue projecting the notification until the person is a threshold distance from the autonomous vehicle. In a further example, the autonomous vehicle can continue projecting the notification for a threshold period of time.

Alternatively, when the gaze of the person is not aimed at the autonomous vehicle 100, after the threshold period of time, after completion of the predefined maneuver, and/or after the threshold distance is reached, it is contemplated herein that the computing system 122 can be further configured to inhibit the projector 120 from projecting a notification on the ground of the environment exterior the autonomous vehicle 100 at the location adjacent the person.

Because the person and/or the autonomous vehicle may move during this extended projection, the notification calibration system 212 can be further configured to apply the affine transform to receive output during this extended period. The notification calibration system 212 can apply the affine transform continuously and/or periodically.

Figure 4:
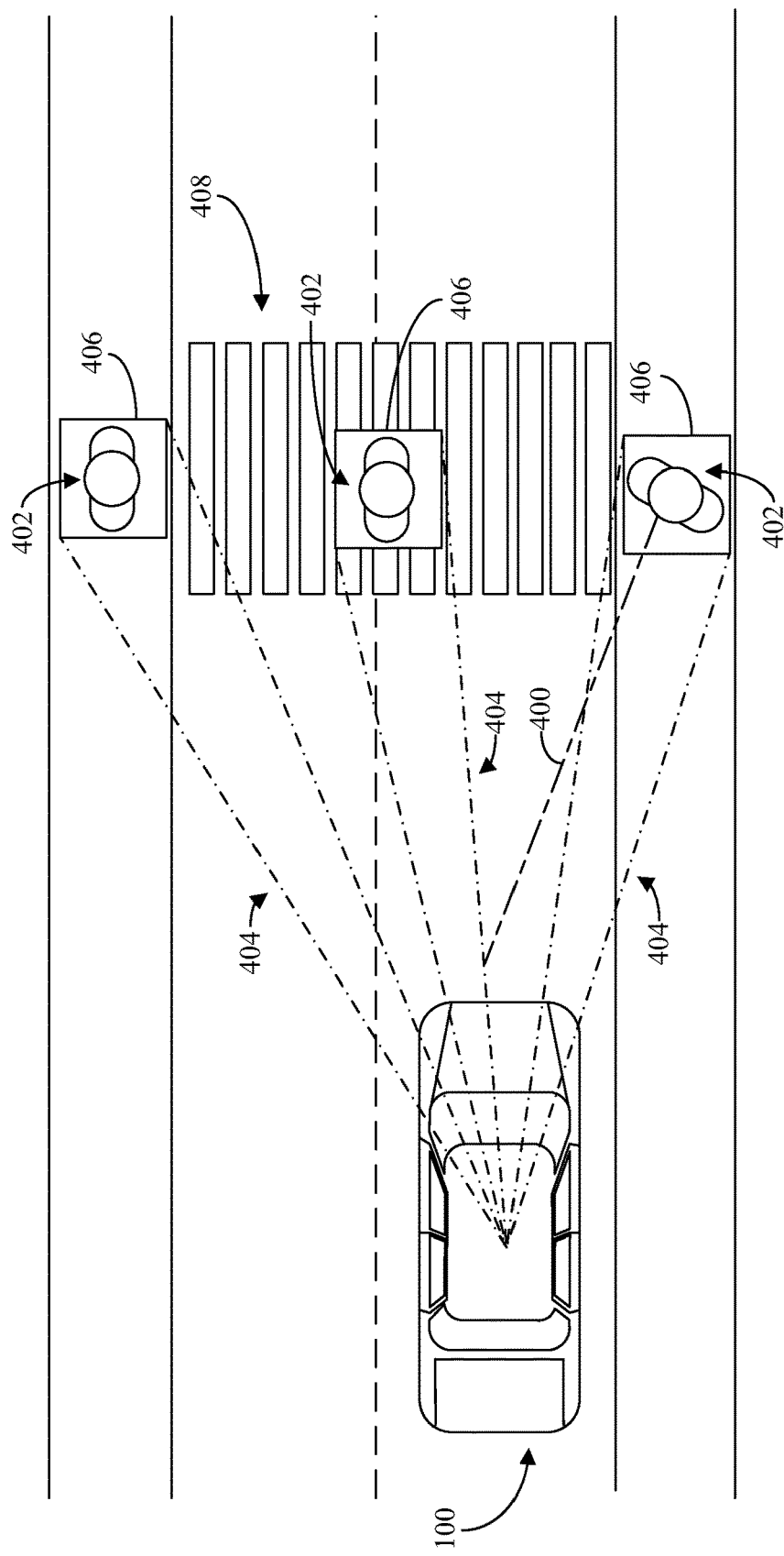
FIG. 4 illustrates another exemplary driving environment of an autonomous vehicle.

FIG. 4 illustrates an exemplary embodiment of the autonomous vehicle 100 projecting the notification while a person performs a predefined maneuver, namely crossing a street at a crosswalk. In the illustrated embodiment, the gaze tracker system 128 of the autonomous vehicle 100 detects that a gaze 400 of a person 402 is aimed at the autonomous vehicle 100. The notification system 130 identifies an initial position of the person 402 and the notification calibration system 212 uses this information to calibrate the notification for projection. Subsequent to this calibration, the notification system 130 causes the projector 120 to project 404 a notification 406 at the initial position.

In the illustrated embodiment, the autonomous vehicle 100 remains stationary as the person 402 crosses the street using crosswalk 408. In order to inform the person 402 that the autonomous vehicle 100 is aware of the position of the person 402 as they use the crosswalk 408 without requiring the person 402 to continually look at the autonomous vehicle 100 as they cross the street, as the person 402 crosses the street the notification system 130 can simultaneously move the notification 406 with the person 402. Because elevation of the surface the notification is being projected on and/or distance of the surface from the autonomous vehicle 100 may change as the person 402 crosses the street, the notification calibration 212 may continuously apply the affine transform as the person 402 changes locations by providing new inputs and receiving corresponding outputs. The notification calibration system 212 can then use those corresponding outputs to calibrate the notification 406 for the new positions and/or surface elevations.

Figure 5:
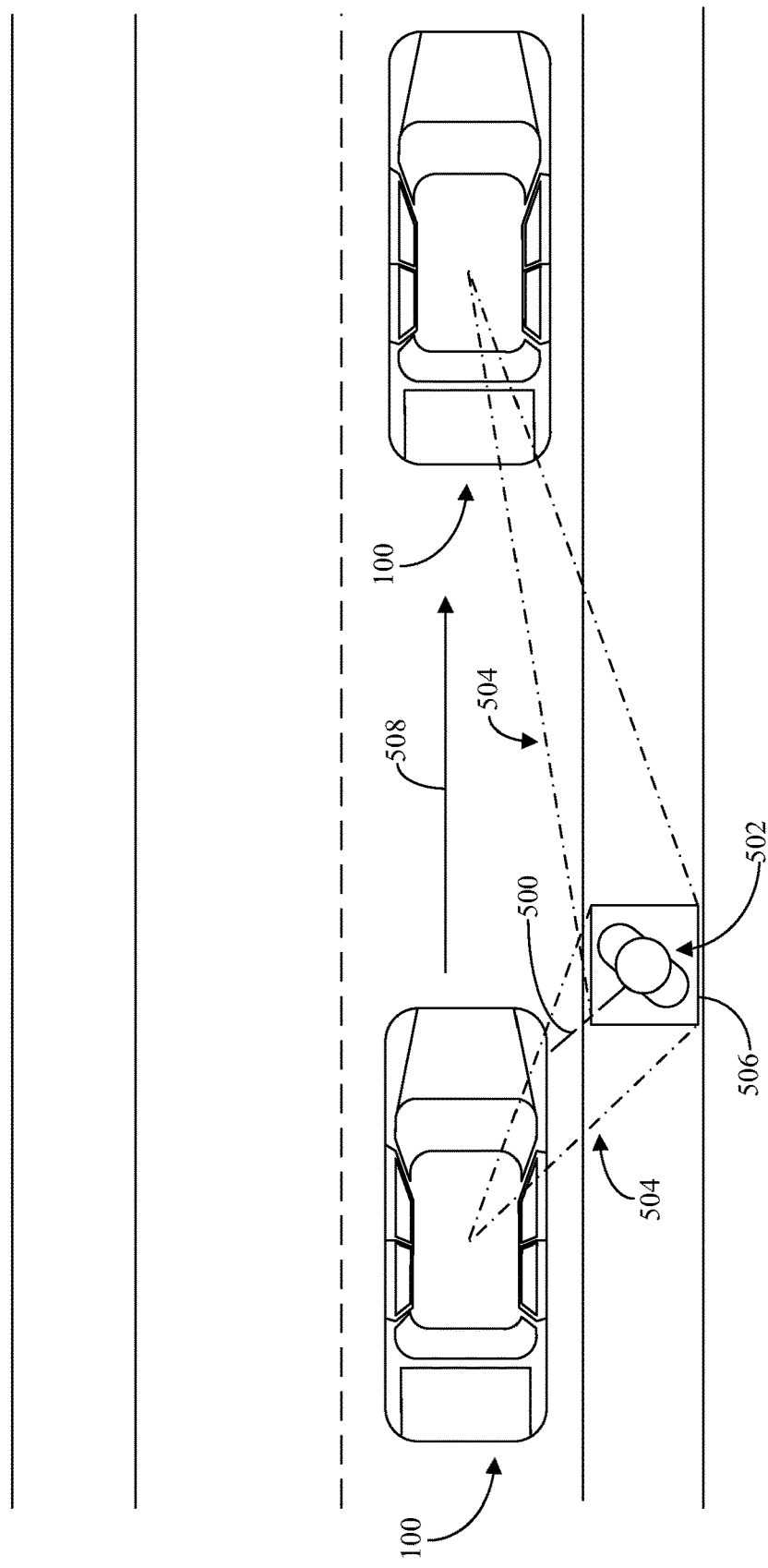
FIG. 5 illustrates a further exemplary driving environment of an autonomous vehicle.

FIG. 5 illustrates an exemplary embodiment of the autonomous vehicle 100 projecting the notification while a person is within a threshold distance of the autonomous vehicle. In the illustrated embodiment, the gaze tracker system 128 of the autonomous vehicle 100 detects that a gaze 500 of a person 502 is aimed at the autonomous vehicle 100. The notification system 130 identifies an initial position of the person 502 and the notification calibration system 212 uses this information to calibrate the notification for projection. Subsequent to this calibration, the notification system 130 causes the projector 120 to project 504 a notification 506 at the initial position.

In the illustrated embodiment, the person 502 remains stationary while the autonomous vehicle 100 travels along the road in a direction 508. While the person 502 remains within a threshold distance of the autonomous vehicle 100, the autonomous vehicle 100 can be configured to project the notification 506. Here, unlike the example illustrated in FIG. 4, elevation of the surface the notification 506 is projected onto may not change but the distance from the projector 120 to the surface will as the autonomous vehicle travels along the road. Therefore, the notification calibration system 212 may continuously apply the affine transform by providing new inputs and receiving corresponding outputs. The notification calibration system 212 can then employ those corresponding outputs to calibrate the notification 506 for the new distances from the projector 120 to the surface.

Figure 6:
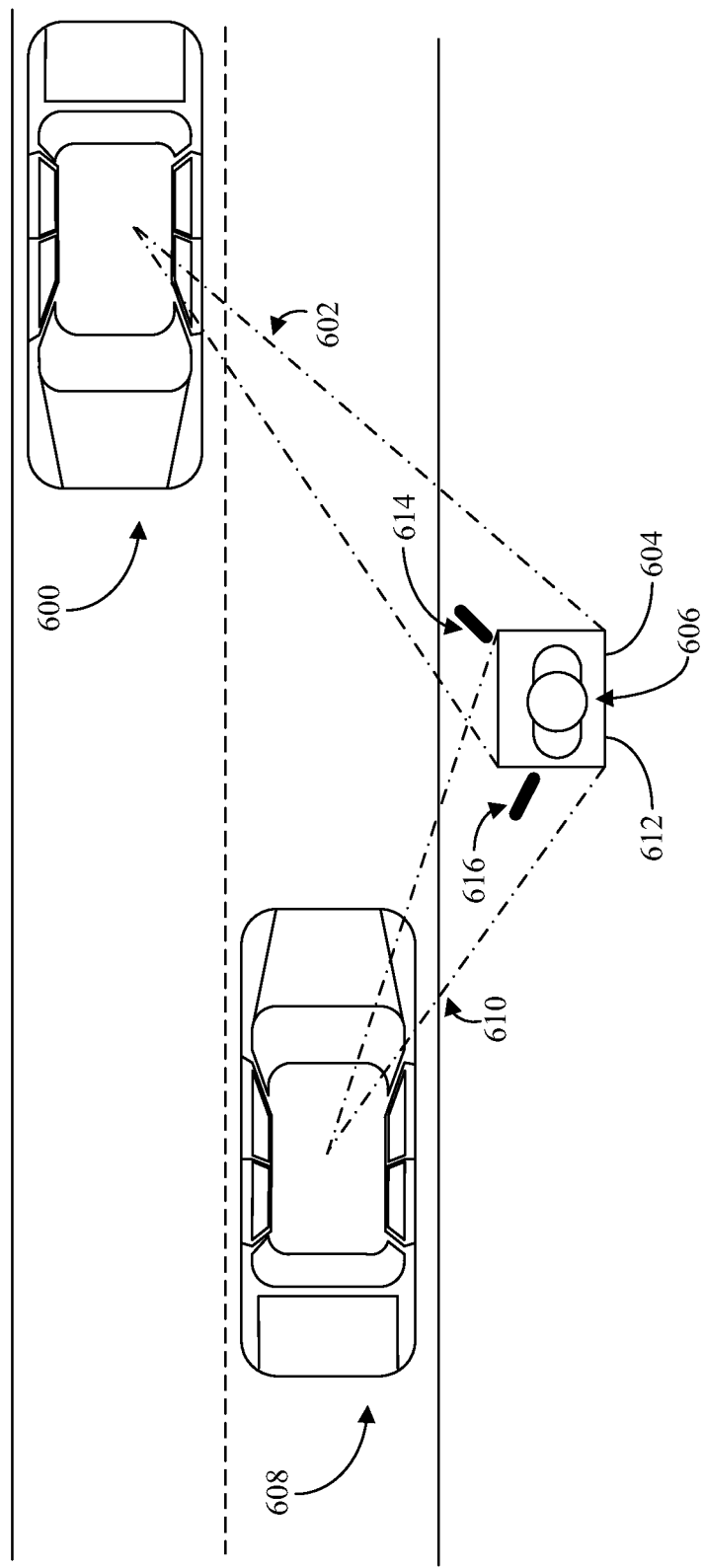
FIG. 6 illustrates a yet further exemplary driving environment of a plurality of autonomous vehicles.

Turning to FIG. 6, it is contemplated herein that two or more autonomous vehicles may project a notification for the same person at similar times causing overlapping notifications. To this end, a notification may further include an indication of which autonomous vehicle is projecting the notification. This indication can also help a person determine which autonomous vehicle is projecting the notification when multiple autonomous vehicles are present.

As illustrated, a first autonomous vehicle 600 projects 602 a first notification 604 for a person 606. A second autonomous vehicle 608 simultaneously projects 610 a second notification 612 for the same person 606. The simultaneous projections can cause the first notification 604 and the second notification 612 to overlap which may prevent the person 606 from accurately determining which autonomous vehicle 600 and/or 608 is projecting a notification. Therefore, the first notification 604 can include a first indication 614 and the second notification 612 can include a second indication 616.

The indication can take any suitable form for informing the person of the identity of the autonomous vehicle projecting the notification. In one example, the indication can comprise a shape and/or symbol located around a perimeter of the notification indicating the position of the autonomous vehicle relative to the person. In another example, the indication can comprise an identification of an autonomous vehicle (e.g., serial number) that is visible on the autonomous vehicle in the environment exterior of the autonomous vehicle.

Figure 7:
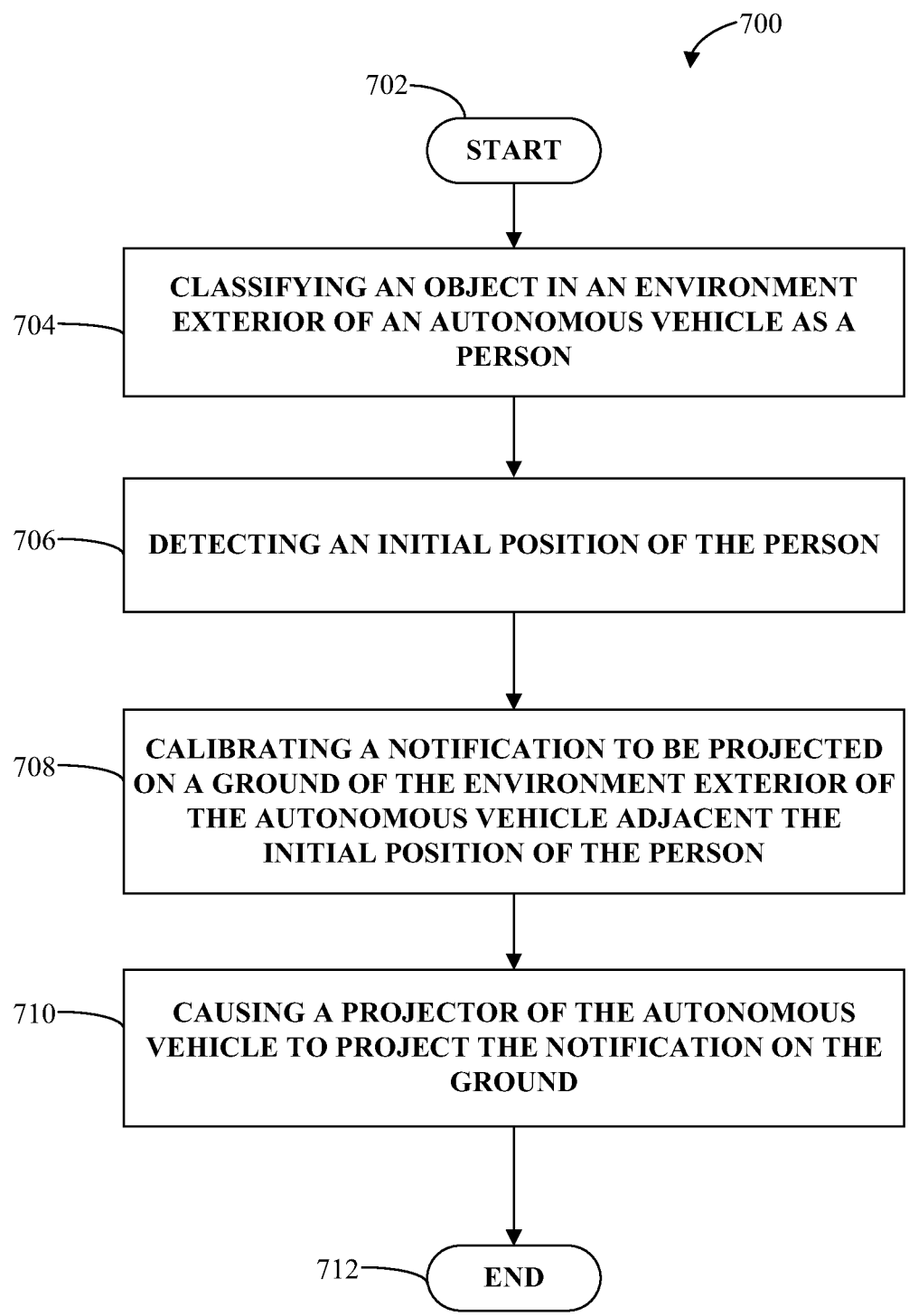
FIG. 7 is a flow diagram that illustrates an exemplary methodology executed by a computing system of an autonomous vehicle for projecting a notification on the ground in an environment exterior of the autonomous vehicle.

FIG. 7 illustrates an exemplary methodology 700 for projecting a notification to an object via an autonomous vehicle. While the methodology is shown as being a series of acts that are performed in a sequence, it is to be understood and appreciated that the methodology is not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium displayed on a display device, and/or the like.

Referring now to FIG. 7 an exemplary methodology 700 for projecting a notification to an object via an autonomous vehicle is illustrated. The methodology 700 begins at 702, and at 704, a computing system classifies an object in an environment exterior of the autonomous vehicle as a person. At 706, responsive to the classification, the computing system can detect an initial position of the person. At 708, responsive to detecting the initial position, the computing system can further calibrate a notification to projected on a ground of the environment exterior of the autonomous vehicle adjacent the initial position of the person. The notification can be calibrated based on a transform from a position of a projector of the autonomous vehicle to the ground. The transform may be applied based on a predefined height map of the ground the notification is being projected on. At 710, responsive to the calibration, the computing system can additionally cause the projector to project the notification on the ground of the environment exterior of the autonomous vehicle. The notification can be configured to inform the person that the autonomous vehicle detects a position of the person. The methodology 700 concludes at 712.

In an embodiment of the methodology 700, responsive to detecting movement of the object relative to the autonomous vehicle, the computing system can further move the notification along the ground simultaneous with movement of the object along a movement path of the object. Moving the notification can include calibrating the notification based on a second output of the transform from the position of the projector to ground adjacent the moved object.

In another embodiment of the methodology 700, responsive to the autonomous vehicle moving relative to the object, the computing system can calibrate the notification based on a second output of the transform applied based on a moved position of the projector to the ground.

In a further embodiment of the methodology 700, the computing system can project the notification until the object exceeds a threshold distance from the autonomous vehicle, the object completes a predefined maneuver, and/or a predefined threshold projection time is exceeded.

In yet another embodiment of the methodology 700, the step of detecting the initial position of the person can include detecting a gaze of the person. In a version of this embodiment, the step of causing the projector to project the notification comprises projecting the notification when the gaze of the person is detected as being aimed at the autonomous vehicle.

In a yet further embodiment of the methodology 700, the step of classifying the object as a person can include classifying the object according to a predefined list of person classes. The computing system can then select the notification to be projected based on the classification of the person class. In a version of this embodiment, a first notification can be provided to a first person class and a second, different notification can be provided to a second person class.

Figure 8:
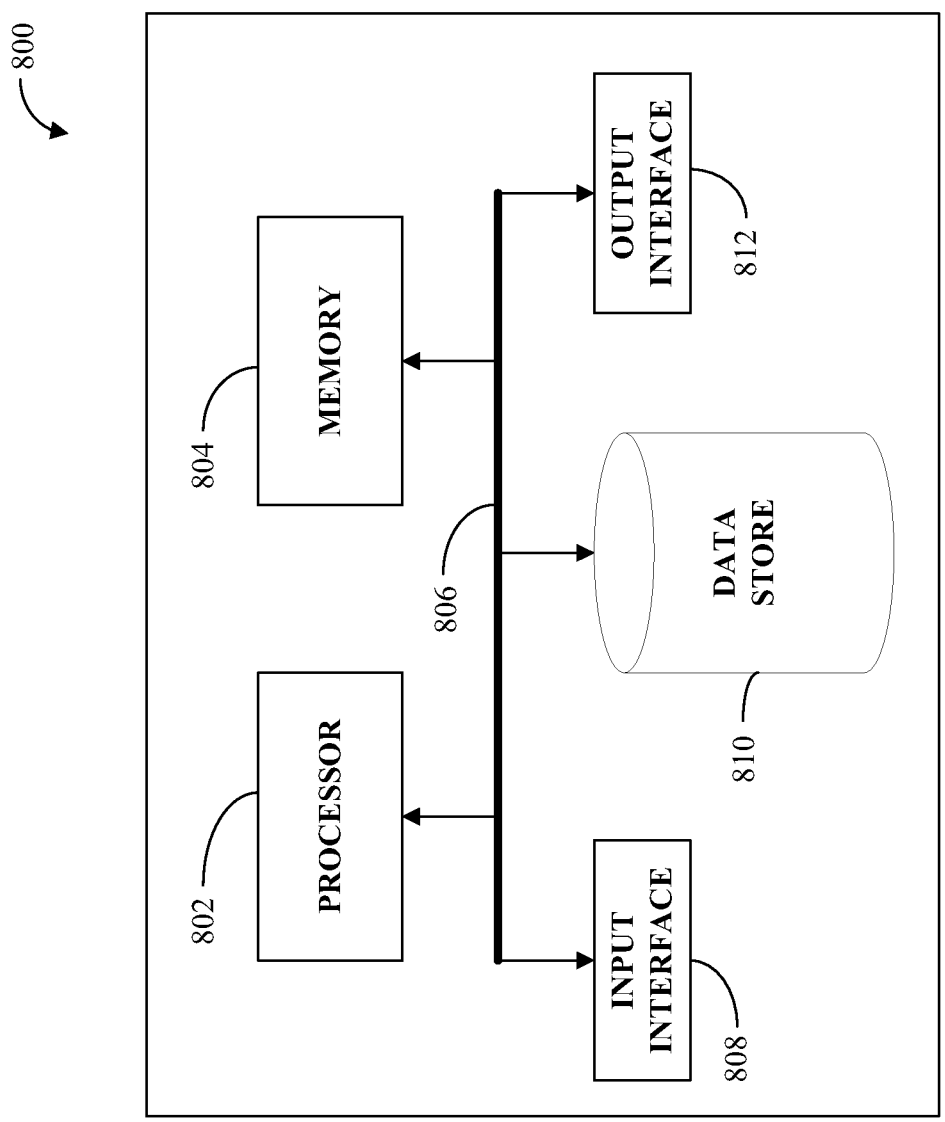
FIG. 8 illustrates an exemplary computing system.

Referring now to FIG. 8, a high-level illustration of an exemplary computing device that can be used in accordance with the systems and methodologies disclosed herein is illustrated. For instance, the computing device 800 may be or include the mobile computing device or the computing system. The computing device 800 includes at least one processor 802 that executes instructions that are stored in a memory 804. The instructions may be, for instance, instructions for implementing functionality described as being carried out by one or more components discussed above or instructions for implementing one or more methods described above. The processor 802 may be a GPU, a plurality of GPUs, a CPU, a plurality of CPUs, a multi-core processor, etc. The processor 802 may access the memory 804 by way of a system bus 806. In addition to storing executable instructions, the memory 804 may also store geolocation coordinates of suggested locations or landmarks, roadways, user identification, user preferences, etc.

The computing device 800 additionally includes a data store 810 that is accessible by the processor 802 by way of the system bus 806. The data store 810 may include executable instructions, geolocation coordinates of suggested locations or landmarks, roadways, user identification, user preferences, etc. The computing device 800 also includes an input interface 808 that allows external devices to communicate with the computing device 800. For instance, the input interface 808 may be used to receive instructions from an external computer device, from a user, etc. The computing device 800 also includes an output interface 812 that interfaces the computing device 800 with one or more external devices. For example, the computing device 800 may display text, images, etc. by way of the output interface 812.

Additionally, while illustrated as a single system, it is to be understood that the computing device 800 may be a distributed system. Thus, for instance, several devices may be in communication by way of a network connection and may collectively perform tasks described as being performed by the computing device 800.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. An autonomous vehicle, comprising:
a sensor system configured to output data representative of an object in an environment exterior of the autonomous vehicle;
a projector;
a data store, wherein the data store includes a predefined height map of an area traversed by one or more autonomous vehicles; and
a computing system that is in communication with the sensor system and the projector, wherein the computing system comprises:
a processor; and
memory that stores computer-executable instructions that, when executed by the processor, cause the processor to perform acts comprising:
classifying the object as a person based on the data outputted by the sensor system;
responsive to the classification, detecting an initial position of the person;
responsive to the detection, calibrating a notification to be projected on a ground of the environment exterior of the autonomous vehicle adjacent the initial position of the person, wherein the notification is calibrated based on an output of a transform from a position of the projector to the ground, wherein the transform is applied based on the predefined height map of the ground the notification is being projected on; and
responsive to the calibration, causing the projector to project the notification on the ground of the environment exterior of the autonomous vehicle.

2. The autonomous vehicle of claim 1, wherein the step of classifying the object as a person comprises classifying the object according to a predefined list of person classes, wherein the acts further comprise:
responsive to classifying the person class, selecting the notification to be projected based on the classification of the person class.

3. The autonomous vehicle of claim 2, wherein a first notification is selected for a first person class, wherein a second notification is selected for a second person class, wherein the first notification and the second notification are different.

4. The autonomous vehicle of claim 1, wherein the notification is projected near a footprint of the object.

5. The autonomous vehicle of claim 1, the acts further comprising:
responsive to detecting movement of the object relative to the autonomous vehicle, moving the notification along the ground simultaneous with movement of the object along a movement path of the object, wherein moving the notification comprises calibrating the notification based on a second output of the transform from the position of the projector to the ground adjacent the moved object.

6. The autonomous vehicle of claim 1, the acts further comprising:
responsive to the autonomous vehicle moving relative to object, calibrating the notification based on a second output of the transform from a moved position of the projector to the ground.

7. The autonomous vehicle of claim 1, further comprising:
a vehicle propulsion system;
a braking system; and
a steering system,
the acts further comprising:
controlling at least one of the vehicle propulsion system, the braking system, or the steering system to cause the autonomous vehicle to yield to the object.

8. The autonomous vehicle of claim 1, the acts further comprising:
causing the projector to project the notification until at least one of:
the object exceeds a threshold distance from the autonomous vehicle;
the object completes a predefined maneuver; or
a predefined threshold projection time is exceeded.

9. The autonomous vehicle of claim 1, wherein the step of detecting an initial position of the person further comprises detecting a gaze of the person, wherein the step of causing the projector to project the notification comprises projecting the notification when the gaze of the person is detected as being aimed at the autonomous vehicle.

10. The autonomous vehicle of claim 1, wherein the notification includes an indicator of the position of the autonomous vehicle relative to the projected notification.

11. The autonomous vehicle of claim 1, wherein the person is one of:
a pedestrian;
a cyclist; or
a service animal; or
an operator of a differing vehicle.

12. A method performed by a computing system, the computing system comprising a processor and memory, the method comprising:
classifying an object in an environment exterior of an autonomous vehicle as a person;
responsive to the classification, detecting an initial position of the person;
responsive to detecting the initial position, calibrating a notification to be projected on a ground of the environment exterior of the autonomous vehicle adjacent the initial position of the person, wherein the notification is calibrated based on an output of a transform from a position of a projector of the autonomous vehicle to the ground, wherein the transform is applied based on a predefined height map of the ground the notification is being projected on; and
responsive to the calibration, causing the projector to project the notification on the ground of the environment exterior of the autonomous vehicle, wherein the notification is configured to inform the person that the autonomous vehicle detects a position of the person.

13. The method of claim 12, further comprising:
responsive to detecting movement of the object relative to the autonomous vehicle, moving the notification along the ground simultaneous with movement of the object along a movement path of the object, wherein moving the notification comprises calibrating the notification based on a second output of the transform applied based on the position of the projector to ground adjacent the moved object.

14. The method of claim 12, further comprising:
responsive to the autonomous vehicle moving relative to object, calibrating the notification based on a second output of the affine transform applied based on a moved position of the projector to the ground.

15. The method of claim 12, further comprising:
causing the projector to project the notification until at least one of:
the object exceeds a threshold distance from the autonomous vehicle;
the object completes a predefined maneuver; or
a predefined threshold projection time is exceeded.

16. The method of claim 12, wherein the step of detecting an initial position of the person further comprises detecting a gaze of the person, wherein the step of causing the projector to project the notification comprises projecting the notification when the gaze of the person is detected as being aimed at the autonomous vehicle.

17. The method of claim 12, wherein the step of classifying the object as a person comprises classifying the object according to a predefined list of person classes,
wherein the acts further comprise:
responsive to classifying the person class, selecting the notification to be projected based on the classification of the person class.

18. The method of claim 17, wherein a first notification is selected for a first person class, wherein a second notification is selected for a second person class, wherein the first notification and the second notification are different.

19. An autonomous vehicle comprising:
a computer-readable storage medium that comprises instructions that, when executed by one or more processors, cause the one or more processors to perform acts comprising:
receiving output from a sensor system in the autonomous vehicle, wherein the output comprises data representative of an object in an environment exterior of the autonomous vehicle;
responsive to receiving the output, classifying the object as a person;
responsive to the classification, detecting an initial position of the person;
responsive to the detection, calibrating a notification to be projected on a ground of the environment exterior of the autonomous vehicle adjacent the initial position of the person, wherein the notification is calibrated based on an output of a transform from a position of the projector to the ground, wherein the transform is applied based on the predefined height map of the ground the notification is being projected on; and
responsive to the calibration, causing a projector of the autonomous vehicle to project the notification on the ground of the environment exterior of the autonomous vehicle.

20. The autonomous vehicle of claim 19, wherein the step of detecting an initial position of the person further comprises detecting a gaze of the person, wherein the step of causing the projector to project the notification comprises projecting the notification when the gaze of the person is detected as being aimed at the autonomous vehicle.

* * * * *